Figure 1:
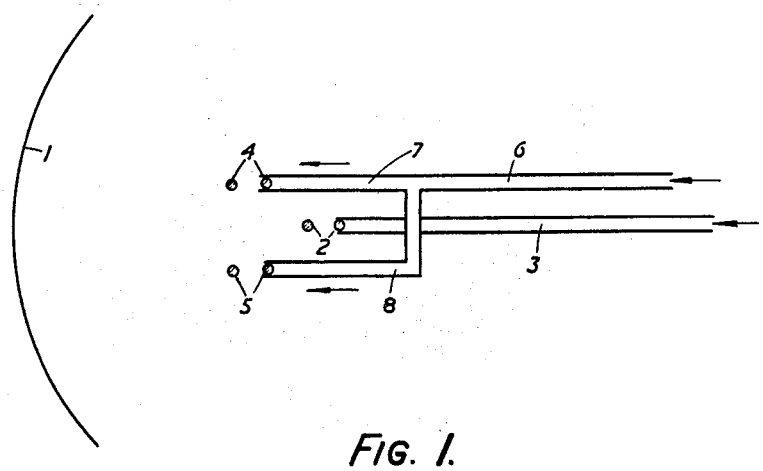

July 20, 1965  D. H. SHINN  3,196,444
INTERROGATING ANTENNA WITH CONTROL RADIATION
Filed Nov. 17, 1961

INVENTOR
Douglas Harold Shinn
BY
Baldwin & Wight
ATTORNEYS 3,196,444
INTERROGATING ANTENNA WITH CONTROL
RADIATION
Douglas Harold Shinn, Great Baddow, Essex, England, assignor to The Marconi Company Limited, a British company
Filed Nov. 17, 1961, Ser. No. 153,141
Claims priority, application Great Britain, Mar. 9, 1961, 8,659/61
5 Claims. (Cl. 343—835)

This invention relates to aerial systems and more specifically to space scanning pulsed radar aerial systems for use in so-called secondary radar systems, i.e. radar systems in which the "targets" carry so-called transponders (receivers and re-transmitters) which, on receipt of a signal from an interrogating radar station automatically transmit a signal which is received back at said station.

As is well known the normal space scanning aerial systems such as are ordinarily employed in primary radar systems—i.e. radar systems in which the targets are passive and act in the system as mere radio reflectors—have radiation polar diagrams which inevitably exhibit directional side lobes as well as the desired main directional lobe, there being usually at least one pair of well pronounced side lobes on opposite sides of and at small angle to the main lobe. Such an aerial system is unsatisfactory for use in a secondary radar system because the main lobe and the sidelobes may cause a target transponder to respond and, therefore, if a transponder responds to the main lobe and one pair of side lobes (for example) that transponder, when swept through by the radiation from such an aerial system, will respond three times and ambiguity as to the direction of the target as well as confusion of the radar display by the undesired additional received signals, will result.

The foregoing difficulty is well known and various proposals have been made to avoid it. Probably the most satisfactory of these known proposals and one which is at the moment accepted for international use, consists in providing the interrogating radar station of a secondary radar system with two component aerial systems, herein termed the interrogating component system and the control component system respectively, of which the interrogating system provides the main directional radiation polar diagram lobe (with its inevitably accompanying side lobes) and the control component system provides a radiation polar diagram which extends at least over the arc occupied by the main and side lobes, and is, over that arc, of a more or less constant field strength intermediate between the maxima of the main and largest side lobes, the two systems being pulsed in quick succession and co-operating transponders in the radar system being so arranged that they will not respond unless the difference between their received signal strengths from the main and control component systems or the ratio of their received signal strengths from the main and control component systems exceeds a predetermined value. For the sake of brevity of description a radar station constructed and arranged for use in a secondary radar system operating in the manner just described will be herein termed a "secondary radar station with control radiation." The present invention seeks to provide improved and simple aerial systems suitable for use in secondary radar stations with control radiation. Aerial systems in accordance with this invention offer two main operating advantages over known aerial systems hitherto used in secondary radar stations with control radiation. These two main operating advantages are (1) the invention is alike applicable to and advantageous for those radar stations in which the radiation concentration in the main lobe is in a plane (usually horizontal) and those in which there is a measure of main lobe radiation concentration in a second plane (usually vertical) at right angles to the first and (2) the invention provides from the control component aerial system a radiation polar diagram including two side lobes which "cover" and are considerably stronger than the side lobes of the interrogating component aerial system and which are separated by a "notch" or direction of very small signal strength coinciding with the direction of the main lobe of said interrogating component system. As regards operating advantage (1) above it may be remarked that, if the interrogating component aerial system has radiation concentration only or mainly in the horizontal plane with a polar diagram which is wide in the vertical plane a considerable proportion of the radiation from it will hit the ground (assuming the station is a ground installation) and be reflected from it, thus causing substantial loss of signal strength at low angles of elevation. Moreover, if the terrain in different directions round the station is different—as in practice it is apt to be—such loss of signal strength may be seriously different in different directions. There is, therefore, considerable benefit to be obtained by providing a substantial measure of radiation concentration in the vertical plane as well—e.g. by using a reflector which is curved in both the horizontal and vertical planes—and the present invention, being applicable to stations in which this is done, enables this benefit to be obtained. As regards operating advantage (2) above, the "notch" in the radiation polar diagram from the control component aerial system, coinciding in direction with the main lobe from the interrogating component aerial system, obviously makes that lobe more effective for the purpose for which it is required by making it stand out more distinctly from the polar diagram of the control aerial system.

According to this invention, an aerial system for use in a secondary radar system comprises a focussing aerial element; an interrogating directional aerial at the focus of and directed toward the focussing aerial element for radiating an interrogating field component; two control directional aerials for radiating a control field component, the control directional aerials being directed toward the focussing aerial element and being symmetrically offset from the axis thereof so as to be defocussed with respect thereto by the same amount; and means for feeding the two control directional aerials in phase opposition and for modulating the control field component differently from the interrogating field component.

Preferably the radiation concentrating element is a radio reflector though it is possible to use a lens.

Preferably also the radiation concentrating element is shaped and dimensioned to give concentration in two mutually perpendicular planes, i.e. where the said element is a reflector it is preferably curved in two mutually perpendicular planes.

The aerials of the control component aerial system may take any of a variety of forms known per se, e.g. they may be radio horns or yagi elements with, say, two or three radiator elements.

Figure 2:
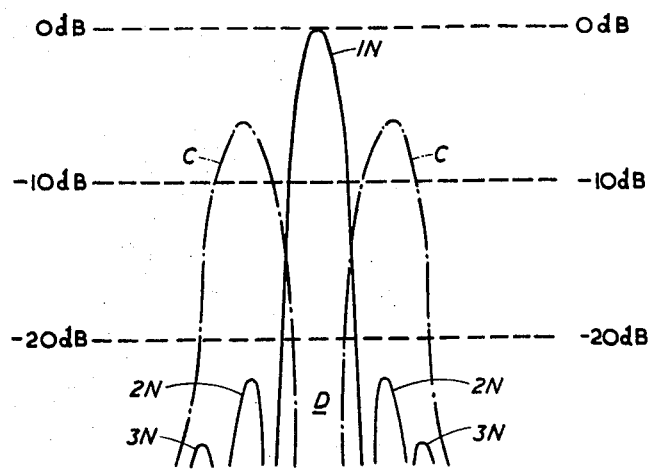
Figure 3:
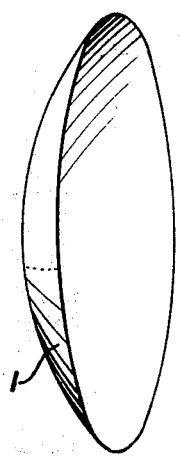

The invention is illustrated in the accompanying drawings in which FIGURE 1 is a diagrammatic sectional plan of one embodiment, FIGURE 2 is an explanatory radiation polar diagram related to the embodiment of FIGURE 1 and FIGURE 3 is a perspective view of a radio reflector shown in FIGURE 1.

Referring to FIGURES 1 and 3, 1 is a radiation concentrating aerial element constituted by a radio reflector which may be of any convenient known shape, e.g. paraboloidal or spherical as shown. At the focus of the reflector 1 is an interrogating component aerial system in the form of a two-element yagi aerial. This yagi aerial is represented by the dots 2. It is fed, as indicated purely diagrammatically, from a suitable interrogating pulsed source (not shown) through a waveguide or other feeder arrangement represented at 3.

There is also a control component aerial system comprising two aerials 4 and 5 also constituted by yagis and energised in phase opposition in any convenient manner known per se from a control pulsed source (not shown) which is actuated in known manner so that corresponding control and interrogating pulses occur with a time separating interval which is short in relation to the interrogating pulse repetition period. In FIGURE 1, the feeder system for the aerials 4 and 5 is represented purely diagrammatically by a branched feeder waveguide 6 having branches 7 and 8 which differ in electrical length by half a wavelength (or an odd multiple thereof) so as to secure the desired opposite phase relation between the energising of the aerials 4 and 5.

The aerials 4 and 5 are defocused with respect to the reflector 1 and are also symmetrically offset with respect to its axis on which the aerial 2 is situated. In FIGURE 1 the defocusing is shown as provided by displacement of the aerials 4 and 5 towards the reflector from the focus thereof but obviously displacement of the aerials 4 and 5 away from the reflector is possible.

FIGURE 2 shows in conventional graphical fashion a radiation polar diagram obtainable with an installation as illustrated in FIGURE 1. The full line curve 1N is the main interrogation lobe obtained by the combination of the aerial 2 with the reflector 1, and 2N and 3N represent side lobes of the radiation from that combination. The polar diagram for radiation produced by the combination of the aerials 4 and 5 with the reflector 1 comprises the chain line lobes C. The deep notch D between these lobes coincides, as will be seen, with the maximum radiation direction of the main lobe 1N.

I claim:
1. An aerial system for use in a secondary radar system, said aerial system comprising a focussing aerial element; an interrogating directional aerial at the focus of and directed toward said element to radiate an interrogating field component; two control directional aerials for radiating a control field component, the control directional aerials being directed toward said element and symmetrically offset from the axis thereof to be defocussed with respect to the element by the same amount; and means for feeding the two control directional aerials in phase opposition and for modulating the control field component differently from the interrogating field component.

2. An aerial system as claimed in claim 1 wherein the focussing aerial element is a radio reflector.

3. An aerial system as claimed in claim 1 wherein the focussing aerial element is shaped and dimensioned to give concentration in two mutually perpendicular planes.

4. An aerial system as claimed in claim 2 wherein the radio reflector is curved in two mutually perpendicular planes.

5. An aerial system as claimed in claim 1 wherein the control component aerials are yagi elements.

References Cited by the Examiner

UNITED STATES PATENTS

| | | | |
|---|---|---|---|
| 2,187,618 | 1/40 | Gerhard | 343—835 X |
| 2,653,238 | 9/53 | Bainbridge | 343—813 |
| 2,846,678 | 8/58 | Best | 343—835 X |
| 3,000,007 | 9/61 | Hansford et al. | 343—100 |

FOREIGN PATENTS 827,219   2/60   Great Britain.

HERMAN KARL SAALBACH, *Primary Examiner.*